(12) United States Patent
Kang

(10) Patent No.: US 8,831,285 B2
(45) Date of Patent: Sep. 9, 2014

(54) DETECTING OBJECTS WITH A DEPTH SENSOR

(75) Inventor: Jinman Kang, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 13/558,538

(22) Filed: Jul. 26, 2012

(65) Prior Publication Data

US 2014/0029788 A1    Jan. 30, 2014

(51) Int. Cl.
*G06K 9/00* (2006.01)
*H04N 9/67* (2006.01)

(52) U.S. Cl.
USPC .......................... 382/103; 382/291; 348/661

(58) Field of Classification Search
CPC ............ G06K 9/00; H04N 9/67; H04N 5/272
USPC ......... 382/100, 103, 106–107, 113, 162, 168, 382/173, 177, 181, 212–213, 219–220, 232, 382/123, 254, 276, 286–295, 305, 312, 104, 382/154, 132; 348/661, 708
See application file for complete search history.

(56) References Cited

U.S. PATENT DOCUMENTS

| | | | |
|---|---|---|---|
| 4,926,170 A | 5/1990 | Beggs et al. | |
| 5,461,231 A | 10/1995 | Sugimoto et al. | |
| 5,937,079 A | 8/1999 | Franke | |
| 6,049,363 A | 4/2000 | Courtney et al. | |
| 6,154,149 A | 11/2000 | Tyckowski et al. | |
| 6,438,491 B1 | 8/2002 | Farmer | |
| 6,496,598 B1 | 12/2002 | Harman | |
| 6,580,385 B1 | 6/2003 | Winner et al. | |
| 6,670,910 B2 | 12/2003 | Delcheccolo et al. | |
| 6,683,969 B1 | 1/2004 | Nishigaki et al. | |
| 7,023,536 B2 | 4/2006 | Zhang et al. | |
| 7,038,846 B2 | 5/2006 | Mandella et al. | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl et al. | |
| 7,251,346 B2 | 7/2007 | Higaki et al. | |
| 7,268,956 B2 | 9/2007 | Mandella et al. | |
| 7,366,325 B2* | 4/2008 | Fujimura et al. | 382/104 |
| 7,372,977 B2 | 5/2008 | Fujimura et al. | |
| 7,375,803 B1 | 5/2008 | Bamji | |
| 7,474,809 B2 | 1/2009 | Carl et al. | |

(Continued)

FOREIGN PATENT DOCUMENTS

RU    109593    10/2011

OTHER PUBLICATIONS

Xu et al., Human detection using depth and gray images, IEEE Conference on Advanced Video and Signal Based Surveillance, 2003, 1 page.

(Continued)

*Primary Examiner* — Seyed Azarian

(57) ABSTRACT

Detecting an object includes receiving depth data and infrared (IR) data from a depth sensor. A first background subtraction is performed on the IR data to create a first mask, and a second background subtraction is performed on the IR data to create a second mask. The first and second masks and the depth data are merged to create a third mask.

18 Claims, 3 Drawing Sheets

(56) References Cited

U.S. PATENT DOCUMENTS

| | | | |
|---|---|---|---|
| 7,590,262 B2* | 9/2009 | Fujimura et al. | 382/104 |
| 7,626,578 B2 | 12/2009 | Wilson et al. | |
| 7,706,603 B2* | 4/2010 | Najafi et al. | 382/154 |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 8,116,519 B2* | 2/2012 | Ng-Thow-Hing et al. | 382/103 |
| 2005/0168437 A1 | 8/2005 | Carl et al. | |
| 2009/0290758 A1 | 11/2009 | Ng-Thow-Hing et al. | |
| 2010/0152967 A1 | 6/2010 | Murphy et al. | |
| 2010/0172567 A1* | 7/2010 | Prokoski | 382/132 |
| 2011/0227915 A1 | 9/2011 | Mandella et al. | |
| 2011/0249190 A1* | 10/2011 | Nguyen et al. | 348/708 |
| 2012/0038549 A1 | 2/2012 | Mandella et al. | |
| 2013/0194418 A1 | 8/2013 | Gonzalez-Banos et al. | |

OTHER PUBLICATIONS

Moeslund et al., A survey of advances in vision-based human motion capture and analysis, Elsevier Inc., 2006, pp. 90-126.

Frintrop et al., Visual Attention for Object Recognition in Spatial 3D Data, Fraunhofer Institut fur Autonome Intelligente Systeme, 2005, 8 pages.

Li et al., Statistical Modeling of Complex Backgrounds for Foreground Object Detection, IEEE Transactions on Image Processing, vol. 13, No. 11, Nov. 2004, pp. 1459-1472.

Suard et al., Pedestrian Detection using Infrared images and Histograms of Oriented Gradients, Intelligent Vehicles Symposium, Jun. 2006, pp. 206-212.

Krotosky et al., On Color-, Infrared-, and Multimodal-Stereo Approaches to Pedestrian Detection, IEEE Transactions on Intelligent Transportation Systems, Vol. 8, No. 4, Dec. 2007, pp. 619-629.

Gould et al., Integrating Visual and Range Data for Robotic Object Detection, M2SFA2 2008: Workshop on Multi-camera and Multi-modal Sensor Fusion, 2008, pp. 1-12.

Radke et al., Image Change Detection Algorithms: A Systematic Survey, Rensselaer Polytechnic Institute, Aug. 19, 2004, pp. 1-32.

Gao, Rui et al; Microsoft Research-Mobile Surface; Microsoft Research; 2010; http://research.microsoft.com/en-us/projects/mobilesurface/.

Hand, Randall; infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys To Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces;IEEE; 2007; http://research.microsoft.com/pubs/132551/cslate1.pdf.

Junlizovic, Sasa et al; Microsoft Research-IllumiShare; Microsoft Research; 2012; http://delivery.acm.org/10.114.5/2210000/2208333/p1919-junuzovic.pdf?p=15.219.153.76&id=2208333&acc=ACTIVE%20SERVICE&key=C2716FEBFA981EF153FE223D54A46A411F9E1F05F1DA6F38&CFID=271558808&CFTOKEN=96334302&_acm_=1387226323_00af7aa5e159c7c67d724c49ef01bacf.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working On Portable Surface; Mar. 2, 2010; http://www.engadget.com/2010/03/02/microsoft-research-working-on-portable-surface/.

Melanson, Donald; Wiimote Repurposed For Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With A Brain; MIT Technology Review; Jul. 2, 2010; http://www.technologyreview.com/news/419639/a-kitchen-countertop-with-a-brain/.

Wilson; Andrew D. et al; Combining Multiple Depth Cameras and Projectors for Interactions On, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using A Depth Camera As A Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

DETECTING OBJECTS WITH A DEPTH SENSOR

BACKGROUND

With developments in three dimensional (3D) depth sensor technologies, precise per-pixel depth data are available without going through multi-view geometry procedures. Such 3D depth sensor information is useful in applications such as object detection, tracking, recognition, human computer interaction, etc.

DETAILED DESCRIPTION

In the following detailed description, reference is made to the accompanying drawings which form a part hereof, and in which is shown by way of illustration specific embodiments in which the disclosed methods and systems may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Detecting flat objects such as photos, a business cards, receipts, paper, etc. on a surface is difficult with current three dimensional (3D) depth sensors. The ability to detect and segment objects, particularly flat objects on a flat surface such as a desktop, is an important component for applications such as interactive working environments. Using depth sensor data for such object segmentation is difficult because the precision of the depth data is relatively low compared to the variation in the depth of these flat objects.

Examples of systems and methods disclosed herein use depth information as well as infrared (IR) information provided by a depth sensor, without the need for additional sensors. Using data from a single sensing device eliminates or at least reduces complexity arising from the need to preprocess, synchronize, align, etc. multiple sensor outputs. In general, disclosed systems and methods address elements required to detect and segment flat objects, including depth normalization and segmentation, IR frame normalization and segmentation with different background subtraction algorithms having different characteristics, and an information merging stage for merging outputs from each of them. In this manner, flat objects on a surface under a projector can be detected and segmented while displaying dynamically changing contents by user interaction on top of the objects.

Figure 1:
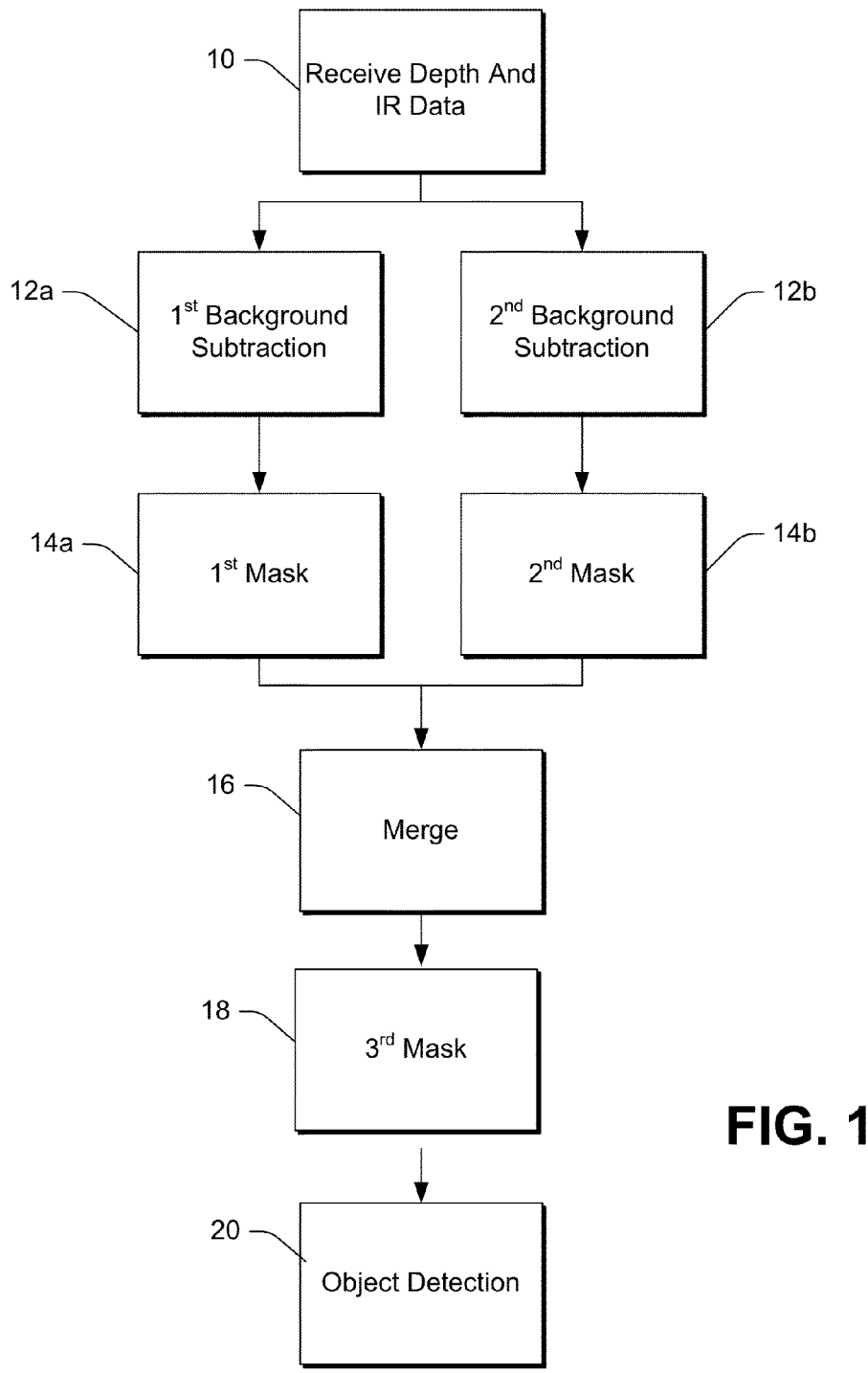
FIG. 1 is a flow diagram illustrating an example of a method in accordance with the present disclosure.

FIG. 1 generally illustrates a method for detecting objects in accordance with the present disclosure. In block 10, depth data and IR data are received from a depth sensor. In block 12a, a first background subtraction is performed on the IR data to create a first mask in block 14a. In block 12b a second background subtraction is performed on the IR data to create a second mask in block 14b. Background subtraction generally refers to identifying and distinguishing object pixels from background pixels. Once the background pixels are identified, they can be removed leaving the object pixels.

In block 16, the first and second masks and the depth data are merged to create a third mask in block 18. An object is detected in block 20 using the third mask. The example method illustrated in FIG. 1 thus processes both depth and IR data from a 3D depth sensor. Different characteristics of the different input streams are addressed using multiple background subtraction methods which correspondingly have different characteristics.

Figure 2:
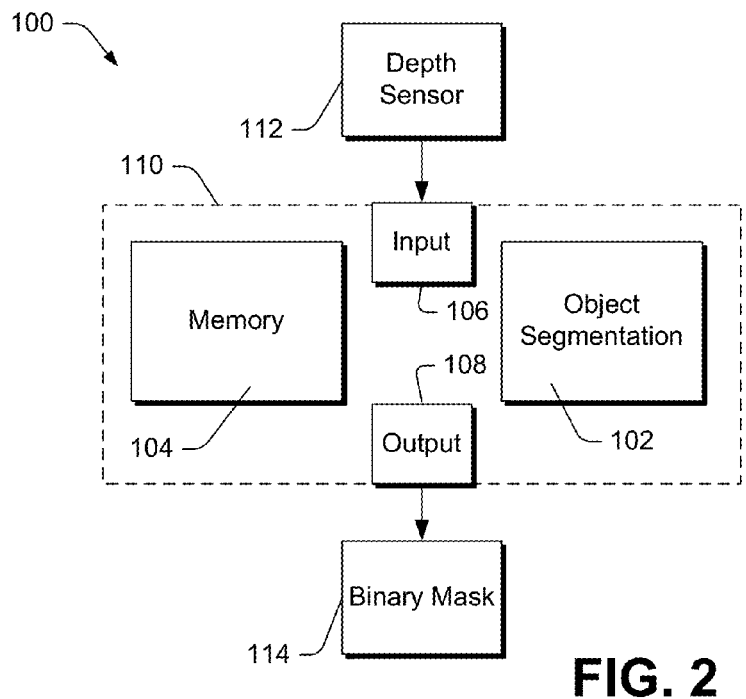
FIG. 2 is a block diagram illustrating an example of a system in accordance with the present disclosure.

FIG. 2 conceptually illustrates aspects of an implementation of an object identification system 100. The system 100 may be implemented by a computer system 110 including one or more discrete modules (or data processing components) that are not limited to any particular hardware, firmware, or software configuration. In the example illustrated in FIG. 2, the computer system 110 includes an object segmentation module 102 which may be implemented by an appropriately programmed processor and a memory 104 accessible thereto. The processor may be implemented by any suitable computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component and in other implementations the respective functionalities of each of one or more of the modules are performed by a respective set of multiple data processing components.

Software code embodying disclosed methods may be stored in the memory 104 or another tangible storage medium that is accessible by the object segmentation module 102. Non-transient storage media suitable for tangibly embodying program instructions and image data include all forms of computer-readable memory, including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM.

A depth sensor 112 is positioned and operated to obtain depth and IR data associated with one or more objects on a surface to an input 106 of the computer system 110. The data from the depth sensor 112 may be stored in the memory 104, or on another memory device accessible by the object segmentation module 102 for processing. The object segmentation module 102 is programmed via instructions stored in the memory 104, or other memory, to process data from the depth sensor 112 as disclosed in conjunction with FIG. 1, for example.

Figure 3:
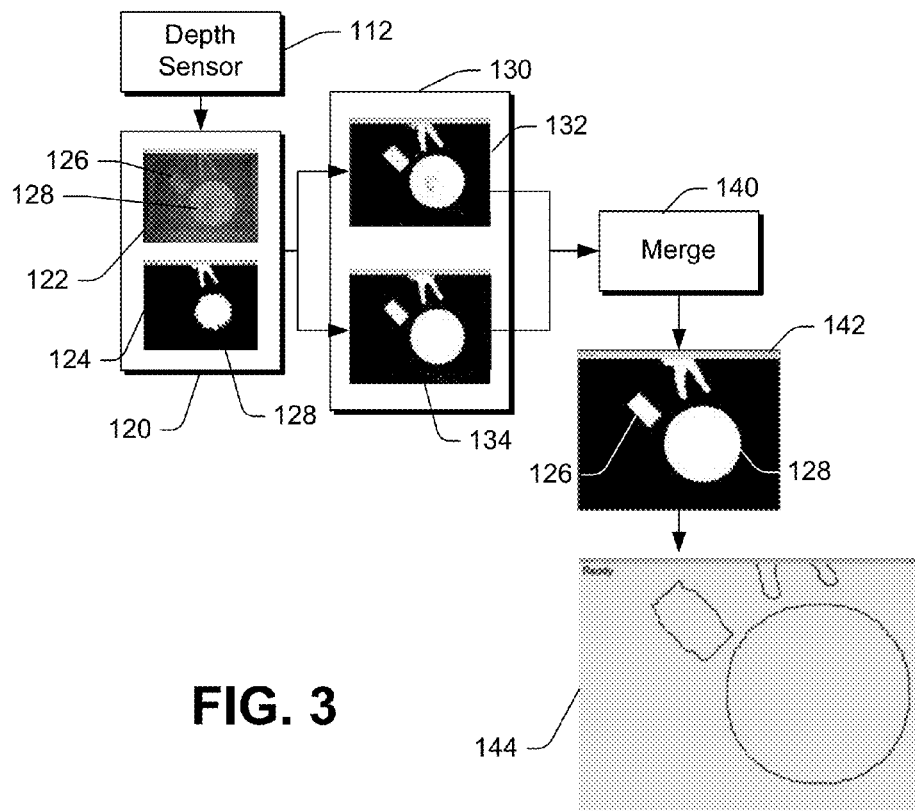
FIG. 3 is a block diagram illustrating examples of data processing in accordance with the present disclosure.

FIG. 3 illustrates further aspects of various implementations. As noted above, the depth sensor 112 provides a signal having both depth and IR data. For example, a suitable depth sensor is available from PrimeSense, Ltd., which is headquartered in Tel Aviv, Israel. In some examples, the depth sensor 112 may be operated following Open Natural Interaction (OpenNI) protocols, which is an open protocol compatible for obtaining raw data with the depth sensor 112. In other examples, other protocols for obtaining data with the depth sensor are used. Another depth sensor that may be used is PMD[vision] ® CamBoard, which may be purchased from PMDTechnologies GmbH, headquartered in Siegen, Germany. The information obtained through the depth sensor 112 may be converted into a format that is compatible with the Open Source Computer Vision Library (OpenCV), which is a library of programming functions used in the computer vision industry.

There are several known issues associated with using raw depth data (16bit real depth value) from depth sensors such as the depth sensor 112. The raw depth data includes noise, and is not fully normalized to the reference surface if the sensor is not perfectly perpendicular to the reference plane such as a flat desk top. Also, the raw depth value for each pixel location might not be stable. For example, in embodiments employing a PrimeSense depth camera there is ±2 to 2.5 mm variance over a short period of time. In the disclosed systems, this issue is addressed through depth normalization and calibration to minimize the variance and bring the depth values for all pixel locations on the reference plane to within an acceptable margin.

Thus, the raw data provided by the depth sensor 112 receives various initial processing, including conversion to a usable format (e.g. OpenCV), depth normalization and calibration, range thresholding, IR normalization, etc. The processed output 120 from the depth sensor 112 includes IR data 122 and depth data 124. In the example illustrated in FIG. 3, the objects in the image provided from the depth sensor 112 include a flat, rectangular object 126 and a circular object 128. As shown in the processed output 120 in FIG. 3, the circular object 128 is visible in both the IR data 122 and the depth data 124, but the flat, rectangular object 126 is not visible in the depth data 124.

In general, an object segmentation process 130 includes performing two background subtractions on the IR data, resulting in two corresponding gray scale object masks 132, 134. The object masks 132, 134 and the processed depth data 124 are merged at block 140, resulting in a binary mask 142 that shows each detected object, including both the flat rectangular object 126 and the circular object 128. An image 144 derived from the binary mask 142 shows the contours of each identified object based on the binary mask 142. The binary mask 142 and/or the image 144 can then be provided from an output 108 for object detection.

Figure 4:
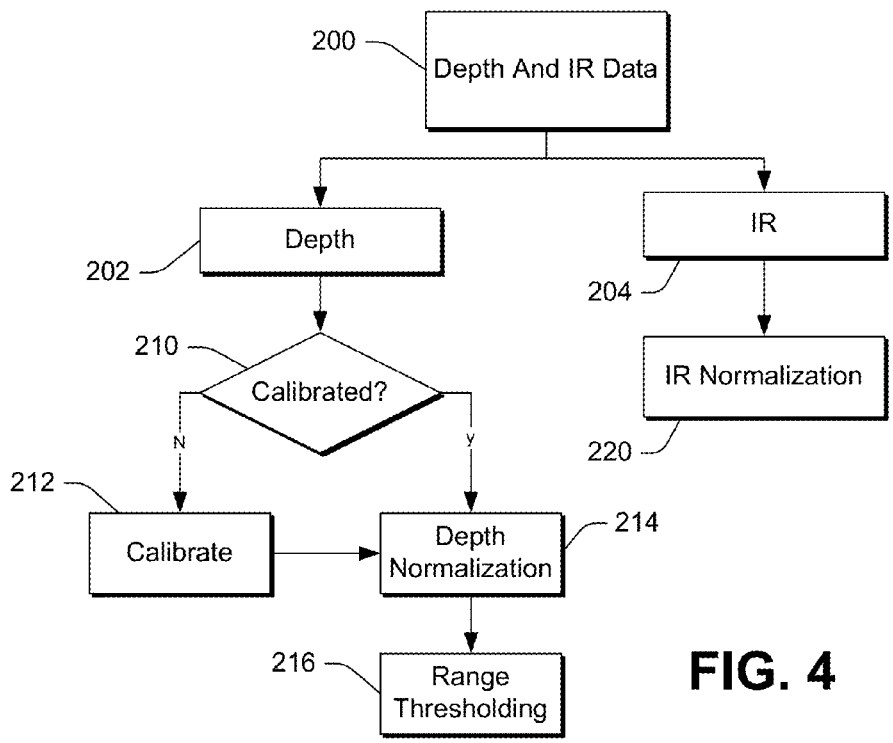
FIG. 4 is a flow diagram illustrating an example of a method in accordance with the present disclosure.

FIG. 4 generally illustrates aspects of the initial data processing in accordance with certain implementations. The data 200 from the depth sensor 112 converted to a usable format such as OpenCV contains both raw depth data 202 and IR data 204. If the depth data 202 has not been calibrated as determined in decision block 210, it goes through a calibration process in block 212. The raw depth data 202 may be calibrated through an ad-hoc calibration approach, a three dimensional homography calibration approach, a three dimensional affine transformation approach, other calibration approaches, or combinations thereof. Following calibration, a depth normalization process 214 is applied to the depth data 202. If decision block 210 determines the raw depth data 202 has already been calibrated, the process flows directly to the depth normalization process in block 214.

In some implementations, the depth sensor 112 sends a signal towards a tangible reference such as a desk top, table top, wall, floor, other physical object, or combinations thereof. In one approach, the system assumes that the tangible reference is flat and substantially perpendicular to the depth sensor 112. In such an example, the reference distances between each location on the tangible reference and the depth sensor 112 may be determined by using aspect ratios. In such an example, the system may determine that the shortest reference distance is directly in front of the depth sensor 112 and thus determine that the entire surface is spaced apart from the camera by that shortest measured reference distance. The point directly in front of the depth sensor may be referred to as the origin for purposes of calibrating. All of the other measured reference distances are between the depth sensor and locations that are not directly in front of the depth sensor. As a consequence, the other reference distances are longer. The other locations are offset from the origin by an offset distance. The offset distance may be determined by using the longer measured reference distance and the shortest measured reference distance as two of the sides of a triangle. The remaining triangle's side length may be calculated and may be equal to the offset distance. Thus, the accurate three dimensional coordinate of this offset location may be determined and the system may normalize its measurements of the tangible reference to reflect the true coordinate.

In other examples, the tangible reference is not planar, and therefore, the calibration process is more complex. In such examples, the raw data may be calibrated to reflect the actual coordinates of the tangible reference in three dimensional space. The system may form a virtual reference approximately on the tangible reference determined by the calibration of the raw data. The accurate three dimensional coordinates of the offset locations may be determined with the following equation: Calibrated Depth=(H)(Measured Depth). H may be represented by the following matrix function:

$$\begin{bmatrix} U' \\ V' \\ W' \\ T' \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} U \\ V \\ W \\ T \end{bmatrix}, \text{ where } X = \frac{U}{T}, Y = \frac{V}{T}, Z = \frac{W}{T},$$

and where U, V, W, and T are a homogenous representations of [X, Y, Z] and $U^1$, $V^1$, $W^1$, and $T^1$ represent the calibrated coordinates adjusted to reflect their true three dimensional positions. The homography parameters $h_{11}$~$h_{44}$ correspond to the null space of matrix M from the following equation:

$$MH = \begin{bmatrix} x_1 & y_1 & z_1 & 1 & 0 & 0 & 0 & 0 & 0 & 0 & 0 & 0 & -x'_1x_1 & -x'_1y_1 & -x'_1z_1 & -x'_1 \\ 0 & 0 & 0 & 0 & x_1 & y_1 & z_1 & 1 & 0 & 0 & 0 & 0 & -y'_1x_1 & -y'_1y_1 & -y'_1z_1 & -y'_1 \\ 0 & 0 & 0 & 0 & 0 & 0 & 0 & 0 & x_1 & y_1 & z_1 & 1 & -z'_1x_1 & -z'_1y_1 & -z'_1z_1 & -z'_1 \\ & & & & & & & \vdots & & & & & & & & \\ x_5 & y_5 & z_5 & 1 & 0 & 0 & 0 & 0 & 0 & 0 & 0 & 0 & -x'_5x_5 & -x'_5y_5 & -x'_5z_5 & -x'_5 \\ 0 & 0 & 0 & 0 & x_5 & y_5 & z_5 & 1 & 0 & 0 & 0 & 0 & -y'_5x_5 & -y'_5y_5 & -y'_5z_5 & -y'_5 \\ 0 & 0 & 0 & 0 & 0 & 0 & 0 & 0 & x_5 & y_5 & z_5 & 1 & -z'_5x_5 & -z'_5y_5 & -z'_5z_5 & -z'_5 \end{bmatrix} \begin{bmatrix} h_{11} \\ h_{12} \\ h_{13} \\ h_{14} \\ h_{21} \\ h_{22} \\ h_{23} \\ h_{24} \\ h_{31} \\ h_{32} \\ h_{33} \\ h_{34} \\ h_{41} \\ h_{42} \\ h_{43} \\ h_{44} \end{bmatrix} = \begin{bmatrix} 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix},$$

where the variables in matrix M represent actual 3D coordinates measurements (x,y,z) from the depth sensor and corresponding 3D coordinates (x',y',z') on the virtual reference. The homography parameters $h_{11}$~$h_{44}$ are determined from matrix M through singular value decomposition.

In some examples, the offset locations are determined with the following equation: Calibrated Depth=(A)(Measured Depth). A may be represented by the following matrix function:

$$\begin{bmatrix} X' \\ Y' \\ Z' \\ 1 \end{bmatrix} = \begin{bmatrix} r_{11} & r_{21} & r_{13} & T_x \\ r_{21} & r_{22} & r_{23} & T_y \\ r_{31} & r_{32} & r_{33} & T_z \\ 0 & 0 & 0 & 1 \end{bmatrix} \begin{bmatrix} X \\ Y \\ Z \\ 1 \end{bmatrix},$$

where the $r_{xx}$ variables represents rotation and the $T_x$ variables represents translation. In this calibration approach, X, Y, and Z represent the measured coordinates, and 1 represents a reference point in the three dimensional space referred to as the origin. To calibrate for X coordinate of any of the measured coordinates, X, Y, and Z are multiplied by the variables $r_{11}$, $r_{12}$, and $r_{13}$, respectively to determine the translation angle from the origin to move the X coordinate in three dimensional space. After the translation angle is determined, the X coordinate may be translated along that angle by a distance determined by 1 multiplied by the $T_x$. The final location of the X coordinate determines the X coordinate's value. The values for the Y and Z coordinates may be determined in a similar manner. The variables of matrix function A may be estimated using factorization from the following equation:

$$\begin{bmatrix} x_1 & y_1 & z_1 & 1 & 0 & 0 & 0 & 0 & 0 & 0 & 0 & 0 \\ 0 & 0 & 0 & 0 & x_1 & y_1 & z_1 & 1 & 0 & 0 & 0 & 0 \\ 0 & 0 & 0 & 0 & 0 & 0 & 0 & 0 & x_1 & y_1 & z_1 & 1 \\ & & & & & \vdots & & & & & & \\ x_4 & y_4 & z_4 & 1 & 0 & 0 & 0 & 0 & 0 & 0 & 0 & 0 \\ 0 & 0 & 0 & 0 & x_4 & y_4 & z_4 & 1 & 0 & 0 & 0 & 0 \\ 0 & 0 & 0 & 0 & 0 & 0 & 0 & 0 & x_4 & y_4 & z_4 & 1 \end{bmatrix} \begin{bmatrix} r_{11} \\ r_{12} \\ r_{13} \\ t_x \\ r_{21} \\ r_{22} \\ r_{23} \\ t_y \\ r_{31} \\ r_{32} \\ r_{33} \\ t_z \end{bmatrix} = \begin{bmatrix} x'_1 \\ y'_1 \\ z'_1 \\ \vdots \\ x'_4 \\ y'_4 \\ z'_4 \end{bmatrix},$$

where the variables of the matrix represent actual 3D coordinates measurements from the depth sensor, and $x_1'$, $y_1'$, and $z_1'$ represent corresponding 3D coordinates on the virtual reference.

The example process illustrated in FIG. 4 further includes a range thresholding in block 216. The system applies a threshold by the following convention in some implementations:

$$dst(x, y) = \begin{cases} maxVal & \text{if } src(x, y) > thresh \\ 0 & \text{otherwise} \end{cases}$$

where maxVal is 255. This thresholding is used in a later information merging stage such as the merging in block 16 of FIG. 1. A depth image, a gray scaled depth mask with the reference surface compensation, and different gray scaled masks from other segmentation modules using IR frames are combined. As shown in the image 124 of FIG. 3, the processed depth data provides a robust segmentation when the objects have enough depth, but it fails to segment a flat object such as the rectangular object 126.

The IR data is subjected to an IR frame normalization process in block 220, where the IR frames are rescaled into gray scaled frames by the following convention:

$$dst(x,y) = src(x,y)*255/\max$$

where max is a max value of the source IR frame. This normalization reduces saturation effects from IR structure light, which can cause an instability issue when various background subtraction algorithms are applied against them such as in blocks 12a and 12b of FIG. 1. The IR normalization process 220 improves the stability of the system. To further improve system stability, some implementations employ a preprocessing filter such as smoothing, median filter, adaptive thresholding and by-pass filter. One particular implementation uses a non-local Means filter.

As noted above in conjunction with FIG. 1, the object segmentation using the IR data includes performing two different background subtractions 12a, 12b. Typically, different background subtraction methods have different strengths and weaknesses. Using multiple background subtractions allows the system to leverage the strengths of the respective background subtraction methods to compensate for weaknesses in those methods. In some implementations, the background subtraction methods include an Adaptive Gaussian Mixture Model (AGMM) background subtraction and an accumulated weighted frame difference background subtraction. The AGMM based approach tends to be robust to noisy input, but may take additional time to adapt to sudden changes such as exposure or illumination changes. The accumulated weighted frame difference approach is sensitive to image changes, but it is not as robust as the AGMM approach with noisy input.

Even using multiple background subtractions, the IR data alone may not be sufficient for all object detection instances. For example, some issues such as IR shadow, solid inside and boundary detection of the object, segmentation of overlapped objects, etc. might not be adequately addressed using IR data alone. In accordance with the present disclosure, these issues are addressed by combining the object masks from the IR segmentations 132, 134 with the depth image 124 as shown in FIG. 3.

Figure 5:
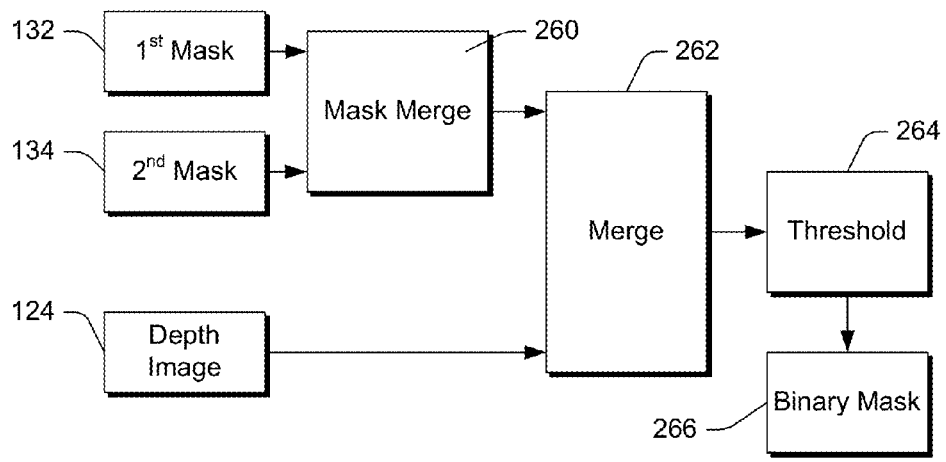
FIG. 5 is a flow diagram illustrating an example of a method in accordance with the present disclosure.

FIG. 5 illustrates further aspects of an example information merging process. The first and second object masks 132, 134 resulting from the respective first and second background subtractions are combined in a mask merging process 260. In some examples, the merging of the two masks 132, 134 is accomplished by using a weighted average, where the weight is chosen empirically. The merged masks are then merged with the depth data 124 in a second merging process 260. Merging the IR masks with the depth image 124 uses an adaptive weighted average process in some implementations, which can be controlled by the depth perception of the detected objects against the neighborhood background. In some implementations, the merged IR object masks and the depth data are subjected to a thresholding process 264 and a binary mask 266 is produced for object detection.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
    receiving depth data and infrared (IR) data from a depth sensor;
    performing a first background subtraction on the IR data to create a first mask;
    performing a second background subtraction on the IR data to create a second mask;
    merging the first and second masks and the depth data to create a third mask, wherein merging the first and second masks and the depth data to create a third mask includes an adaptive weighted average process; and
    detecting an object using the third mask.
2. The method of claim 1, wherein at least one of the first and second background subtractions is an Adaptive Gaussian Mixture Model background subtraction.
3. The method of claim 1, wherein at least one of the first and second background subtractions is an accumulated weight frame difference background subtraction.
4. The method of claim 1, further comprising:
    creating a depth map from the depth data.
5. The method of claim 4, wherein creating a depth map includes
    monitoring a tangible reference at a reference distance from the depth sensor; and
    maintaining a virtual reference approximately on calibrated three dimensional coordinates derived from said reference distance.
6. The method of claim 1, further comprising:
    rescaling the IR data into gray scaled frames.
7. A system, comprising:
    an input to receive depth data and infrared (IR) data from a depth sensor;
    an object segmentation module to:
        perform a first background subtraction on the IR data to create a first mask;
        perform a second background subtraction on the IR data to create a second mask;
        merge the first and second masks and the depth data to create a third mask, wherein the object segmentation module is to merge the first and second masks and the depth data to create a third mask using at least an adaptive weighted average process; and
    an output to output the third mask for detecting an object using the third mask.
8. The system of claim 7, further comprising:
    a memory accessible by the processor, the memory to store depth data and IR data received from a depth sensor.
9. The system of claim 7, further comprising:
    a depth sensor to obtain and send the depth data and IR data to the processor.
10. The system of claim 7, wherein at least one of the first and second background subtractions is an Adaptive Gaussian Mixture Model background subtraction.
11. The system of claim 7, wherein at least one of the first and second background subtractions is an accumulated weight frame difference background subtraction.
12. A non-transitory computer readable storage medium storing instructions that when executed cause a system to:
    receive depth data and infrared (IR) data from a depth sensor;
    perform a first background subtraction on the IR data to create a first mask;
    perform a second background subtraction on the IR data to create a second mask; and
    merge the first and second masks and the depth data to create a third mask, wherein the instructions to merge the first and second masks and the depth data to create a third mask include instructions to conduct an adaptive weighted average process.
13. The computer readable storage medium of claim 12, further comprising instructions to:
    detect an object using the third mask.
14. The computer readable storage medium of claim 12, wherein at least one of the first and second background subtractions is an Adaptive Gaussian Mixture Model background subtraction.
15. The computer readable storage medium of claim 12, wherein at least one of the first and second background subtractions is an accumulated weight frame difference background subtraction.

16. The computer readable storage medium of claim 12, further comprising instructions to:
   create a depth map from the depth data.

17. The computer readable storage medium of claim 16, wherein the instructions to create a depth map include instructions to:
   monitor a tangible reference at a reference distance from the depth sensor; and
   maintain a virtual reference approximately on calibrated three dimensional coordinates derived from said reference distance.

18. The computer readable storage medium of claim 12, further comprising instructions to:
   rescale the IR data into gray scaled frames.

* * * * *